United States Patent [19]

Worthington

[11] Patent Number: 4,660,390
[45] Date of Patent: Apr. 28, 1987

[54] AIR CONDITIONER WITH THREE STAGES OF INDIRECT REGENERATION

[76] Inventor: Mark N. Worthington, 17404 N. 99th Ave., Apartment 309, Sun City, Ariz. 85373

[21] Appl. No.: 843,659

[22] Filed: Mar. 25, 1986

[51] Int. Cl.⁴ ............................................. F25D 17/04
[52] U.S. Cl. ........................................ 62/309; 62/310
[58] Field of Search ................. 62/304, 309, 311, 171, 62/92, 121; 261/140 R, 133

[56] References Cited

U.S. PATENT DOCUMENTS

3,747,362  7/1973  Mercer .............................. 62/311 X
4,023,949  5/1977  Schlom et al. ....................... 62/309

Primary Examiner—Henry A. Bennet
Attorney, Agent, or Firm—Herbert E. Haynes, Jr.

[57] ABSTRACT

An air conditioner utilizing an evaporatively cooled main heat exchanger for receiving ambient air and indirectly reducing the total heat content of the ambient air for delivery to a point of use. The air conditioner includes an air diversion mechanism which diverts a portion of the air after its passage through the main heat exchanger and supplies the cooled diverted air for use in the evaporative cooling of the main heat exchanger. A feedback mechanism may also be provided for diverting another portion of the air after its passage through the main heat exchanger and supplying this cooled diverted air for mixing with the ambient air prior to its being received by the main heat exchanger. An exhaust air return mechanism may also be employed to direct the air which is used in the evaporative cooling of the main heat exchanger to a preliminary heat exchanger which utilizes that relatively cool air for indirectly reducing the total heat content of the incoming ambient air prior to its being supplied to the main heat exchanger. The air diversion mechanism, the feedback mechanism, and the exhaust air utilization mechanism all cause regenerative actions to occur which reduces the temperature of the air delivered to a point of use to temperatures below those which could otherwise be achieved in such air conditioners.

22 Claims, 8 Drawing Figures

AIR CONDITIONER WITH THREE STAGES OF INDIRECT REGENERATION

BACKGROUND OF THE INVENTION

1. Field of the Invention

This invention relates in general to air conditioning devices and more particularly to an air conditioning device which utilizes evaporative cooling in an indirect regenerative manner to cool air.

2. Description of the Prior Art

Devices which cool air by evaporation have been used for many years as a relatively inexpensive way to cool air and a multiplicity of such devices, generally referred to as "evaporative coolers" have been devised and marketed which utilize this well known principle. In general, evaporative coolers mix water directly with warm and relatively dry ambient air and the resulting evaporation reduces the sensible heat of the air which is delivered to a point of use.

In the most commonly used evaporative coolers, the warm and relatively dry ambient air is drawn at a relatively high velocity through wettable excelsior pads, by an air moving device provided within a cabinet. The sensible heat of the air moved into the cabinet in this manner is reduced and the same air moving device is operated to deliver the cooled air into a building, usually by means of a duct system.

Another prior art device of this same general type injects moisture directly into the incoming warm and relatively dry ambient air by spraying a fine mist into the air.

There are several factors which effect the operating efficiency of evaporative coolers, such as dry bulb temperature, wet bulb temperature, and the relative humidity of the ambient air, velocity of the air, and the like. However, in general, evaporative coolers of the above described type are very effective and work best when the relative humidity of the ambient air to be cooled thereby is low and they decrease in efficiency as the relative humidity increases.

As is well known in the art, the evaporative cooling phenomenon is an adiabatic process in that it occurs without any gain or loss in wet bulb temperature which is a reflection of the total heat content of the air. When evaporation occurs, the sensible heat, or dry bulb temperature, of the air is lowered in proportion to the rise of the latent heat of the moisture in the air and this lowering of the dry bulb temperature is dependent on the evaporation rate. When the evaporation rate is low due to the ambient air having a relatively high humidity to start with, the drop in dry bulb temperature of the air is low. The overall result of this is that under atmospheric conditions wherein the air to be cooled has a high relative humidity, the air delivered by the prior art evaporative coolers is uncomfortably hot and humid.

One existing alternative to evaporative coolers are the well known refrigeration type of air conditioning mechanisms which operate on a heat exchange principle wherein the total heat content of the air being treated is reduced by placing it in indirect heat exchange relationship with a refrigerant. Such mechanisms are not effected by the relative humidity and thus are effective at all times. However, refrigeration air conditioning devices of this type are considerably more expensive to purchase and operate than are evaporative coolers, and are becoming increasingly costly to operate as the cost of electricity increases.

For these reasons, it has become a common practice in hot and arid climates to use the relatively inexpensive prior art evaporative coolers when they produce relatively comfortable conditioned air, and switch over to the refrigeration type of air conditioning mechanism during periods when the effectiveness of those evaporative coolers falls below acceptable levels. The high and ever increasing costs of electricity, however, has resulted in many people being unwilling, and in many cases unable, to operate the more expensive refrigeration mechanisms.

One further alternative known to me has been suggested, and has been fully described in U.S. Pat. No. 4,023,949 which issued on May 17, 1977 to L. A. Schlom et al. Briefly, this prior art patent discloses an evaporative refrigeration system wherein fresh ambient air is drawn through the dry side of a heat exchanger, the wet side of which is cooled by evaporation. The passage of incoming air through the heat exchanger extracts heat from the air and the cooled air is directed through ducts of the disclosed system to a load, e.g. a room, to be cooled. As the cooled air passes through the load, it will absorb some of the heat from the load, and that air is returned by ducts, also a part of the system, to a blower compartment of the system. A centrifugal blower is provided in the blower compartment to direct the returned air to the wet side of the heat exchanger where it interacts with a water spray to evaporatively cool the wet side of the heat exchanger. A portion of the cooled air emerging from the dry side of the heat exchanger may be selectively mixed with the return air in the blower compartment. Also, a portion of the return and/or selectively mixed air may be selectively directed into the incoming air movement path as it starts its movement through the dry side of the heat exchanger. The Schlom et al patent also provides an annular duct structure which surrounds the incoming air inlet duct of the system to precool the incoming ambient air. The evaporatively cooled exhaust air emerging from the wet side of the heat exchanger is passed through the annular chamber to accomplish pre-cooling of the incoming ambient air.

The prior art patent of Schlom et al utilizes what may be described as an indirect regenerative technique for reducing the total heat content of the air being cooled in an attempt to produce lower temperatures in the air than can be produced by the conventional evaporation technique alone, and to produce such lowered temperatures without adding moisture to the air. While the Schlom et al patent appears to be an improvement over the conventional evaporative cooler, it is using the wrong air. The air returning from the load is relatively warm due to its having passed through the load and is therefore at a considerably warmer temperature in comparison to the cooled air emerging from the dry side of the heat exchanger. As a result of this, the evaporation process used to cool the wet side of the heat exchanger will not be as efficient as it could be if cooled air emerging from the dry side of the heat exchanger were used exclusively. When the temperature differential across the heat exchanger is less than maximum, the heat exchange capabilities are less than maximum. Even if a portion of the cooled air emerging from the dry side of the heat exchanger is mixed with the return air, the resultant air will still not be at the lowest possible temperature due to the mixing.

Therefore, a need exists for a new and improved air conditioning device which overcomes some of the problems and shortcomings of the prior art.

SUMMARY OF THE INVENTION

In accordance with the present invention, a new and improved air conditioning device is disclosed which utilizes evaporative cooling in a regenerative and indirect manner to reduce the total heat content of the air being cooled to produce lower temperatures than can be achieved with conventional prior art evaporative coolers, and which does not add moisture to the air being cooled as is the case in the prior art evaporative coolers.

The device includes an air input mechanism which is operated to supply ambient air under pressure to a heat exchanger structure so that the air passes between and around a plurality of chiller tubes provided therein. A portion of this air emerging from the heat exchanger structure is diverted without admixture into an input portion of an evaporation chamber and flows through the chiller tubes of the heat exchanger structure and into an output portion of the evaporation chamber and will exit therefrom through an exhaust port.

A water supply is provided in the evaporation chamber and a pump is used to recirculatingly supply the water to a spray mechanism which directs the water spray into the chiller tubes in a direction which is preferably countercurrent to the flow of the diverted air. The countercurrent flows of the water and the air through the chiller tubes of the heat exchanger structure results in evaporation taking place which causes chilling of the chiller tubes and of the water in the water supply.

The incoming ambient air will be reduced in total heat content, i.e., both its sensible and latent heat will be reduced by virtue of its being moved through the heat exchanger structure in heat exchange contact with the chiller tubes. Thus, the air emerging from the heat exchanger sturcture is cooled in much the same manner as air is cooled in a refrigeration type of air conditioning mechanism. This is, the air is cooled in an indirect manner as a result of the heat exchange phenomenon rather than in a direct manner as the result of the evaporation phenomenon.

Since a portion of the air emerging from the heat exchanger structure is diverted without admixture for use in the evaporation chamber, at least two things happen in that chamber. First, conventional evaporative cooling takes place at all times when the air conditioner is operating, and this, as is well known, results in lowering the sensible heat of both the air and the water supply, and this, in turn, results in cooling of the chiller tubes of the heat exchanger structure. Secondly, during initial operating times of the air conditioner, the water supply in the evaporation chamber will give up some of its heat to the relatively cooler air when the water is sprayed into the air. This results in what may be referred to as a regenerative action in that as the temperature of the water supply drops, the temperature of the chiller tubes will drop and this extracts more of the total heat out of the air passing through the heat exchanger. When the total heat content of the air is further reduced in this manner, the temperature of the water supply will correspondingly drop. This regenerative action will continue until equilibrium is achieved, and this usually occurs at about half way between ambient air wet bulb temperature and the dew point. Therefore, the air delivered by the air conditioner of the present invention will have been cooled to a temperature below that which can be achieved in a conventional evaporative cooler and will not have any increase in its moisture content.

In a second embodiment of the above described air conditioner of the present invention, a second form of regenerative action may be employed to augment the operation thereof. In this embodiment of the air conditioner, a feedback duct means is coupled so as to divert a portion of the cooled air emerging from the heat exchanger structure and direct it back to the air input mechanism which mixes this diverted air with the incoming ambient air. By mixing the cool diverted air with the relatively warm ambient air, the temperature of the air entering the heat exchanger structure will be lowered which results in further lowering of the temperature of the air emerging from the heat exchanger structure.

In a third embodiment, the air conditioner of the present invention is provided with a third form of regenerative action which further augments the operation thereof. In this third embodiment, an exhaust air duct is connected to the exhaust port of the output portion of the evaporation chamber for utilizing of the air which would otherwise be exhausted to ambient. The exhaust air duct directs the air from the evaporation chamber through a preliminary heat exchanger which is located in the ambient air inlet of the air input mechanism. The air from the evaporation chamber, which has a relatively lower sensible temperature in comparison to ambient air temperatures, will reduce the total heat content of the incoming ambient air by virtue of an indirect heat exchange accomplished in the preliminary heat exchanger. This, in conjunction with the first two regenerative actions discussed above, results in further lowering of the conditioned air emerging from the air conditioner without adding any moisture to the air.

Accordingly, it is an object of the present invention to provide a new and improved air conditioner.

Another object of the present invention is to provide a new and improved air conditioner which utilizes an evaporatively cooled heat exchanger for indirectly reducing the total heat content of the air being conditioned thereby.

Another object of the present invention is to provide a new and improved air conditioner which utilizes an evaporatively cooled heat exchanger for indirectly cooling the air being conditioned thereby without increasing the moisture content of the conditioned air.

Another object of the present invention is to provide a new and improved air conditioner of the above described character which utilizes some of the conditioned air without admixture in accomplishing the evaporative cooling of the heat exchanger to produce a first regenerative action which results in chilling of the heat exchanger and thus the conditioned air, to temperatures below those which can be achieved by conventional evaporative cooling along.

Another object of the present invention is to provide a new and improved air conditioner of the above described character which includes an air input mechanism which supplies ambient air under pressure to a heat exchanger structure so that the air passes therethrough in heat exchange contact with chiller tubes of the heat exchanger structure.

Another object of the present invention is to provide a new and improved air conditioning structure of the above described type which includes means for diverting some of the air emerging from the heat exchanger structure and directing it without admixture into an evaporation chamber which is operated to cool the chiller tubes of the heat exchanger structure.

Another object of the present invention is to provide a new and improved air conditioning structure of the above described character wherein the evaporation chamber includes an input portion for receiving the diverted air and directing it through the chiller tubes of the heat exchanger structure to an output portion of the evaporation chamber from which the air is exhausted by means of an exhaust port.

Another object of the present invention is to provide a new and improved air conditioner of the above described character wherein a water supply is provided in the evaporation chamber and a pump is operated to recirculatingly supply water to a spray mechanism which directs the water through the chiller tubes of the heat exchanger in a direction preferably countercurrent to the flow of the diverted air therethrough to accomplish the cooling of the chiller tubes.

Another object of the present invention is to provide a new and improved air conditioner of the above described character which utilizes another portion of the conditioned air for producing a second type of regenerative action by mixing that portion of the conditioned air with the warmer incoming ambient air to lower the temperature of the air supplied to the heat exchanger.

Another object of the present invention is to provide a new and improved air conditioning structure of the above described character which includes a feedback means for diverting some of the air emerging from the heat exchanger structure and directing it to the air input mechanism for mixing with the incoming ambient air.

Still another object of the present invention is to provide a new and improved air conditioning structure of the above described character which utilizes air in the output portion of the evaporation chamber to accomplish a third regenerative action for reducing the total heat content of the incoming ambient air.

Yet another object of the present invention is to provide a new and improved air conditioning structure of the above described type which utilizes an exhaust air duct that is connected between the exhaust port of the output portion of the evaporation chamber and a preliminary heat exchanger located in the ambient air input mechanism to utilize the exhaust air from the evaporation chamber to indirectly reduce the total heat content of the incoming ambient air.

The foregoing and other objects of the present invention as well as the invention itself, may be more fully understood from the following description when read in conjunction with the accompanying drawings.

DESCRIPTION OF THE PREFERRED EMBODIMENT

Figure 1:
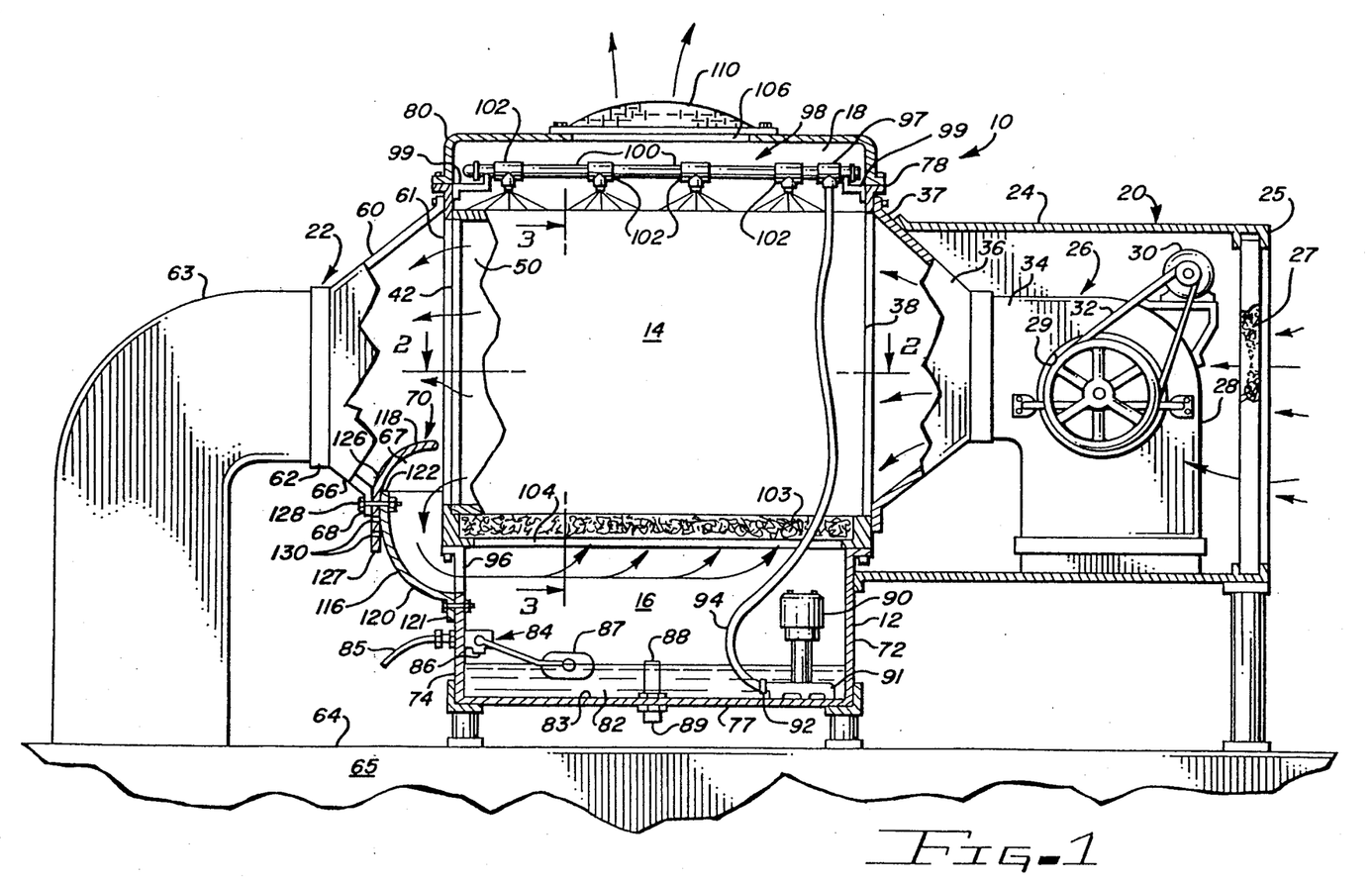
FIG. 1 is a sectional view taken on a vertical plane through a first embodiment of the air conditioner of the present invention.

Referring more particularly to the drawings, FIG. 1 shows a first embodiment of the air conditioner of the present invention which is indicated in its entirety by the reference numeral 10. As will hereinafter be described in detail, the air conditioner 10 includes a main housing, or cabinet 12, in which a heat exchanger structure 14 is mounted in a manner which divides an evaporation chamber, that is defined by the cabinet 12, into an input portion 16 and an output portion 18. The air conditioner 10 further includes an air supply structure 20 connected to one end thereof and an air delivery structure 22 on its opposite end.

The air supply structure 20, which may be of any suitable configuration for supplying air under pressure to the cabinet 12, preferably includes a housing 24 having an air inlet 25 through which ambient air is drawn into the housing under the influence of a negative static pressure produced therein by an air input mechanism 26. The ambient air inlet 25 may have a suitable air filter 27 demountably mounted therein.

The air input mechanism 26 is preferably in the form of a well known centrifugal blower which includes a scroll-shaped blower housing 28 having an impeller wheel (not shown) rotatably journaled between a pair of axial air inlet openings 29 (one shown). A suitable electric motor 30 is employed to drive the impeller wheel by means of a pulley-belt assembly 32. When the centrifugal blower is operated, the ambient air will be drawn into the axial inlets 29 of the blower housing 28 and is expelled, under pressure, from the centrifugal outlet 24 of the blower housing.

A transition duct 36 is mounted on the centrifugal outlet 34 of the blower housing 28, with the outlet end 37 of the transition duct being the air outlet end of the air supply structure 20. The outlet end 37 of the transition duct 36 is suitably attached to the cabinet 12 of the air conditioner 10, and is configured to align with and totally cover the air inlet face 38 of the heat exchanger structure 14 as shown both in FIGS. 1 and 2.

The heat exchanger structure 14 includes a casing 40 which is open at its opposite ends to provide the above mentioned air inlet face 38 at one end and to provide an air outlet face 42 at its opposite end. The opposite side walls 43 and 44 of the casing 40 are closed and the top and bottom walls, or plates 46 and 48, respectively, complete the casing. The top and bottom plates 46 and 48 have a plurality of chiller tubes 50 extending therebetween with the chiller tubes being spacedly arranged to provide spaces 52 between each of the tubes 50 and between the end tubes and the closed side walls 43 and 44 of the casing. The spaces 52 provide the air movement path through which ambient air from the air supply structure 20 passes from the air inlet face 38 to the air outlet face 42 of the heat exchanger structure 14.

Figure 3:
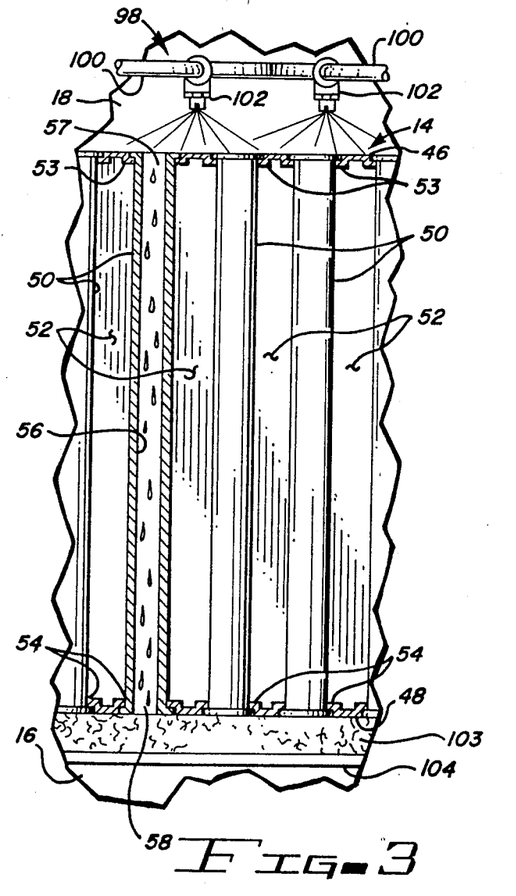
FIG. 3 is an enlarged fragmentary sectional view taken along the line 3—3 of FIG. 1.

As shown best in FIG. 3, each of the chiller tubes 50 extends between a plurality of openings 53 provided in the top plate 46 and an aligned one of a plurality of similar openings 54 formed through the bottom plate 48, and the tubes 50 are secured to the plates such as by having their ends welded, soldered, or otherwise affixed to the plates. Each of the tubes is provided with a longitudinally extending passage 56 one end 57 of which opens up onto the top plate 46 with the opposite end 58 opening onto the bottom plate.

The ambient air supplied by the air supply structure 20 will move through the spaces 52 between the chiller tubes 50 of the heat exchanger structure 14, so that the air will be in heat exchange contact with the exterior of the chiller tubes 50. This will reduce the total heat content of the air so that the air emerging from the outlet face 42 of the heat exchanger structure 14 will be cooled and relatively dry. The moisture content of the air will be the same as it was before its movement through the heat exchanger structure 14.

The cooled air emerging from the outlet face 42 of the heat exchanger structure 14 moves into the air delivery structure 22 which includes a special cooled air outlet duct 60 which defines an air movement path therethrough and has its inlet end 61 suitably connected to the cabinet 12 of the air conditioner 10 and is configured to align with and receive the cooled air from the outlet face 42 of the heat exchanger structure 14. The outlet end 62 of the cooled air outlet duct 60 is suitably configured for connection to a means for delivering the cooled air to a point of use, such as the illustrated duct structure 63 of the type commonly used to direct air through a roof 64 of a building 65.

The bottom wall 66 of the air outlet duct 60 is formed with an opening 67 therein one side of which is open so as to be in communication with the inlet end 61 of the outlet duct 60. The bottom wall 66 of the duct is formed with a depending flange 68 which defines the other side edge of the opening 67 with the opposite ends of the opening 66 being defined by the spaced pair of side walls 69 of the outlet duct 60. As will hereinafter be described, an air diversion means 70 is mounted in the opening 66 of the cooled air outlet duct 60.

Figure 2:
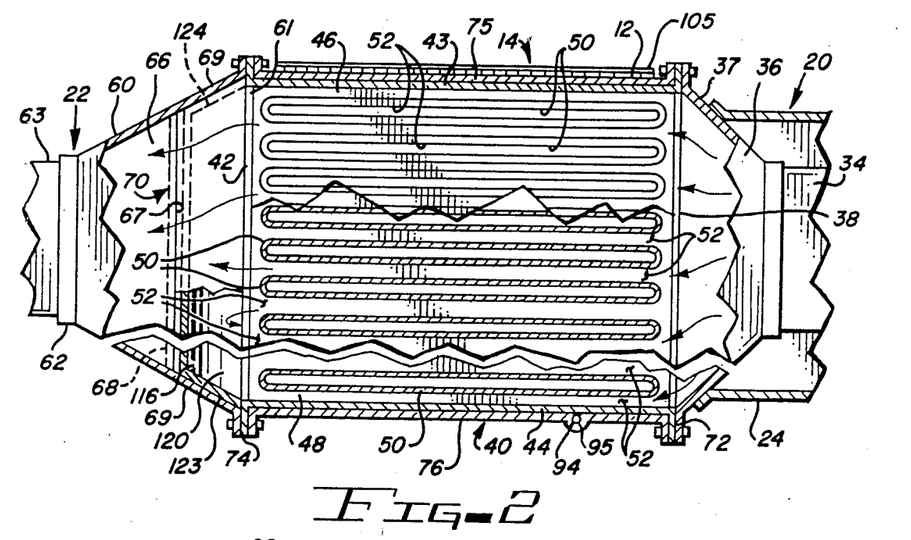
FIG. 2 is a fragmentary sectional view taken along the line 2—2 of FIG. 1.

As shown in FIGS. 1 and 2, the cabinet 12 is a four sided structure including an air inlet end wall 72 and an opposed air outlet end wall 74, an opposed pair of closed side walls 75 and 76, and a closed bottom wall 77. The inlet end wall 72, outlet end wall 74 and the side walls 75 and 76 are formed to provide an endless flange 78 on their upper ends, and a cover 80 is demountably attached to the flange 78 with suitable fasteners. The cabinet 12 and the cover 80 cooperatively define the above mentioned evaporation chamber which is separated into the inlet and outlet portions 16 and 18, respectively, by the heat exchanger structure. The inlet face 38 and the outlet face 42 of the heat exchanger 14 are flush with the inlet end wall 72 and the outlet end wall 74 of the cabinet 12, respectively, and are aligned with suitable air passage openings provided in those end walls of the cabinet. FIG. 2 shows that the opposite side walls 43 and 44 of the casing 40 of the heat exchanger structure are in contiguous engagement with the side walls 75 and 76 of the cabinet 12. Therefore, the input portion 16 and the output portion 18 of the evaporation chamber are totally separated from each other with the chiller tubes 50 of the heat exchanger structure 14 providing the only communication therebetween.

The input portion 16 of the evaporation chamber defined by the cabinet 12 is configured for containment of a water supply 82 in a reservoir 83 provided in the bottom thereof. A floatcontrolled water supply valve 84 is mounted such as in the outlet end wall 74 of the cabinet 12. The water supply valve 84 may be of the well known type commonly used in evaporative coolers, and has an inlet for connection to a water supply conduit 85 and an outlet end 86 for initially supplying water 82 to the reservoir 83 and supplying make-up water thereto under control of the float 87 to replace that lost by evaporation. A conventional over-flow pipe 88 is also provided in the reservoir 83, with the pipe being mounted in the bottom wall 77 of the cabinet 12 so as to have its outlet end 89 depending from the bottom wall 77, so that a suitable drain conduit, or hose (not shown) may be attached thereto.

A pump 90 is mounted in the reservoir 83 of the input portion 16 of the evaporation chamber of the cabinet 12, and the pump 90 has its input end 91 submerged in the water supply 82 with its outlet pipe 92 having one end of a water supply line 94 connected thereto. The water supply line 94 extends upwardly from the input portion 16 of the evaporation chamber through, as seen in FIG. 2, a passageway 95 formed in the side wall 76 of the cabinet 12, into the output portion 18 of the evaporation chamber.

The air outlet end wall 74 of the cabinet 12 has an air inlet opening 96 formed thereacross which is located below and separate from the air outlet face 42 of the heat exchanger, and which opens into the input portion 16 of the evaporation chamber.

The opposite, or upper end of the water supply line 94 is connected to an inlet fitting 97 of a distribution manifold 98 which is mounted in the evaporation chamber's output portion 18 on suitable brackets 99. The distribution manifold 98 includes a suitable array of conduits 100 having spray nozzles 102 spacedly arranged therein so that when operating, the spray emerging from the nozzles 102 will impinge on the total surface area of the top plate 46 of the heat exchanger structure 14, and will pass through the chiller tubes 50 of the heat exchanger structure 14 and will drop therefrom into the reservoir 83 for recirculation by the pump 90. As shown in FIG. 1, a wettable pad 103, such as of excelsior, horse hair, or the like, may be provided so as to be in contiguous engagement with the bottom plate 48 of the heat exchanger structure 14. The wettable pad 103 will catch the water emerging from the outlet ends 58 of the chiller tubes 50 and by wicking action, the entire pad will become wetted. Pads such as that shown and described herein are in common usage in the evaporative cooler industry and are a porous medium which provides an excellent heat exchange contact between the water and the air which pass through the pad, as will hereinafter be described in detail.

The wettable pad 103 is supported in the desired position by means of a suitable channel-shaped frame 104, and the pad may be removed for cleaning or replacement through a hinged door 105 provided in the side wall 75 of the cabinet 12 as shown in FIG. 2.

The cover 80, which encloses the output portion 18 of the evaporation chamber, is provided with a central opening which serves as an exhaust port 106, and a suitable screen 110 is mounted on the exhaust port 106 to prevent foreign objects from entering thereinto. Therefore, air emerging from the input portion 16 of the evaporation chamber will move through the heat exchanger structure 14 into the output portion 18 and is exhausted to ambient through the exhaust port 106.

As hereinbefore mentioned, the air delivery structure 22 includes an air diversion means 70. The air diversion means 70 is employed to divert some of the cooled air emerging from the outlet face 42 of the heat exchanger structure 14 and direct it into the input portion 16 of the evaporation chamber. The air diversion means 70 is an elongated semi-circular trough-shaped structure which opens laterally toward the air outlet end wall 74 of the air conditioner cabinet 12, and is disposed to receive cooled air from the outlet face 42 of the heat exchanger structure 14 and divert it through the air inlet opening 96 into the input portion 16 of the evaporation chamber. The air diversion means 70 is preferably a two-piece assembly including a fixedly mounted bottom member 116 and a vertically adjustably mounted upper member 118.

The fixedly mounted bottom member 116 includes an elongated arcuate surface 120 having a flange 121 extending along its lower edge and the flange is suitably attached, such as with bolts or screws, to the air outlet end wall 74 of the cabinet 12 below the air inlet opening 96. The upper longitudinal edge 122 of the bottom member 116 is disposed in parallel spaced relationship with the depending flange 68 of the air outlet duct 60 and the bottom member 116 has end closing walls 123 and 124 which are in sealed engagement with the inner surfaces of the opposed side walls 69 of the air outlet duct 60.

The upper member 118 is similarly provided with an elongated arcuate surface 126, the upper longitudinal edge of which is disposed in the air outlet stream from the heat exchanger structure 14. An integral flange portion 127 depends tangentially from the arcuate surface 126 and is disposed between the depending flange 68 of the outlet duct 60 and the upper longitudinal edge 122 of the bottom member 116. Suitable bolts 128 are used to demountably interconnect the flange 68 of the air outlet duct 60, the depending flange portion 127 of the upper member 118, and the upper edge of the bottom member 116 in a sandwich-like manner. The depending flange portion 127 of the upper member 118 is provided with a plurality of holes 130 so that the upper member 118 can be vertically adjusted by selectively passing the bolts 128 through the desired ones of the holes 130.

OPERATION

To insure a complete understanding of the present invention, the following is a brief description of the operation of the air conditioner 10.

The preferred operation includes the first step of supplying the necessary electric power to operate the pump 90 and the air input mechanism 26. The air input mechanism 26 will move air into the input portion 16 of the evaporation chamber through the air diversion means 70, and push it upwardly through the wettable pad 103 and the chiller tubes 50 of the heat exchanger structure 14 and exhaust the air to ambient through the exhaust port 106. The pump 90 simultaneously supplies the water 82, under pressure, to the distribution manifold 97 to cause the nozzles 102 to spray water onto the top plate 46 and into the chiller tubes 50 of the heat exchanger structure 14. The sprayed water will pass downwardly through the bores 56 of the chiller tubes 50 under the influence of gravity and the pressure of the spray as it leaves the nozzles 102. The water falling from the bottom ends 58 of the chiller tubes 50 is absorbed by the wettable pad 103, and when saturated, the water will fall into the reservoir 83 for recirculation by the pump 90. The countercurrent flows of the water and the air will result in evaporation within the wettable pad 103 and the chiller tubes 50 in particular, and also within the lower and upper portions 16 and 18, respectively, of the evaporation chamber. This evaporation action will cool the water 82 and the heat exchanger structure 14 to a temperature above, but relatively near the wet bulb temperature of the ambient air, with the exact temperature being determined, for the most part, on atmospheric conditions.

The air input mechanism 26 will simultaneously supply ambient air to the heat exchange structure 14 through which it passes in heat exchange relationship with the chiller tubes 50 and the casing 40. By heat exchange, some of the total heat content of the air will be extracted therefrom to produce cooled air for delivery to the point of use and to the input portion 16 of the evaporation chamber. By using air cooled in this manner for accomplishing the evaporation action which takes place in the evaporation chamber, the water 82 will be cooled to temperatures which are lower than is possible if the evaporation operation were accomplished by direct use of the ambient air. The colder water, in turn, lowers the temperature of the heat exchanger structure 14, which, in turn, lowers the temperature of the air passing therethrough on its way to the point of use and for use in the evaporation chamber. This action, which is referred to as a regenerative action, will occur for a relatively short period of time after the operation of the air input mechanism 26 is started and will cease when the temperature stabilizes which is usually at a point about half way between ambient air web bulb temperature and the dew point.

Figures 4, 5:
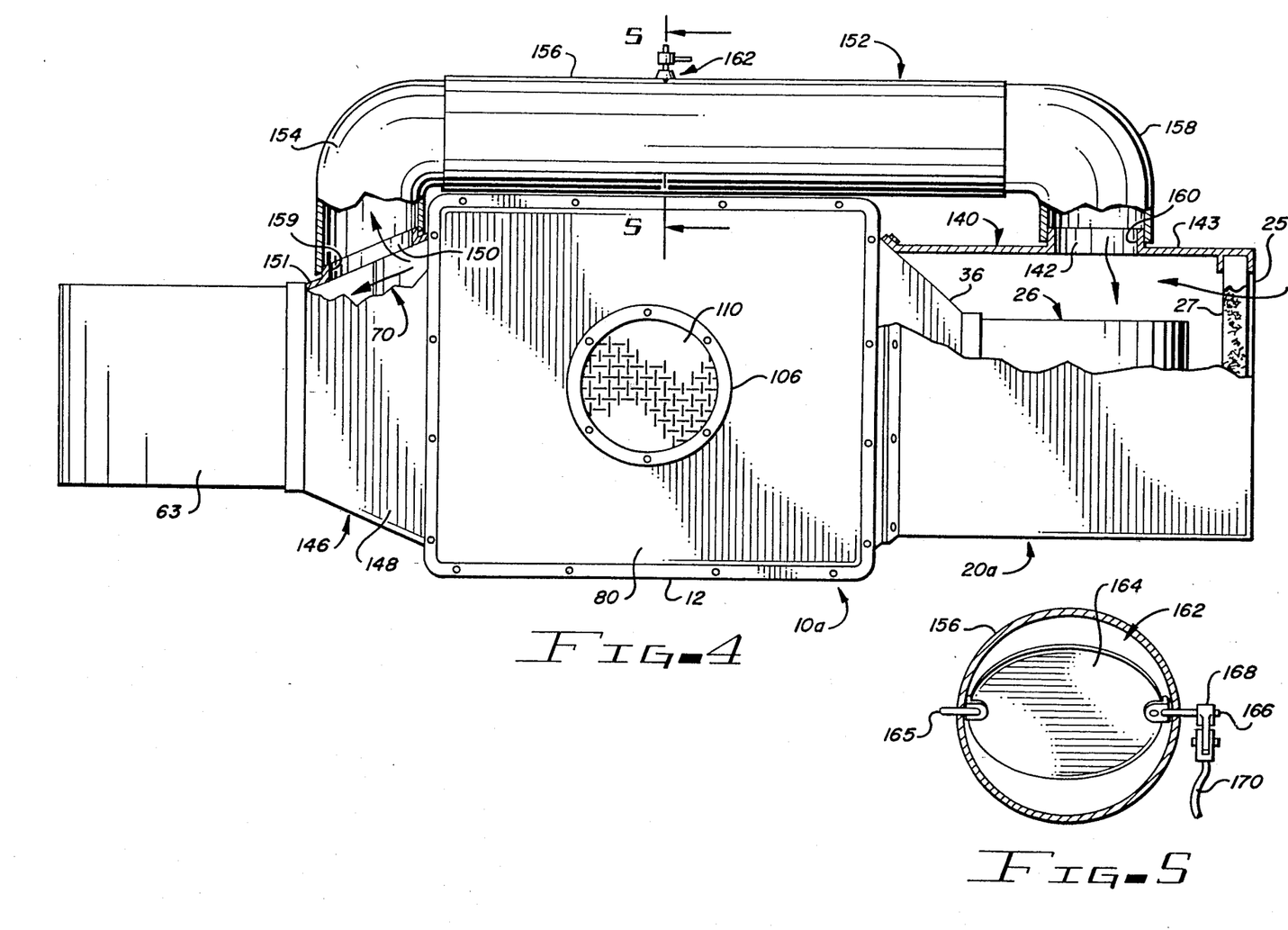
FIG. 4 is a top view of a second embodiment of the air conditioner of the present invention with portions being broken away to show the various features thereof.
FIG. 5 is an enlarged sectional view taken along the line 5—5 of FIG. 4.

Reference is now made to FIGS. 4 and 5, wherein a second embodiment of the air conditioner is illustrated, with this embodiment of the air conditioner being indicated in its entirety by the reference numeral 10a.

The air conditioner 10a is similar to the previously described air conditioner 10 and many of the components remain the same both structurally and functionally. Therefore, the same reference numerals will be used for the components and subassemblies which are common to the air conditioners 10 and 10a.

The air conditioner 10a includes a modified form of air supply structure 20a having a housing 140 with the ambient air inlet 25 formed therein in which the filter 27 is mounted. The housing 140 has an auxiliary air inlet port 142 formed in the side wall 143 thereof for reasons which will hereinafter be described. The air input mechanism 26 is mounted in the housing 140 and operates, as previously described, to supply air under pressure to the transition duct 36.

The air supply structure 20a supplies air to the heat exchanger 14 (FIG. 1) which is mounted in the evaporation chamber defined by the cabinet 12, which cools the air in the hereinbefore fully described manner with the cooled air moving into the air delivery structure 146. The air delivery structure 146 includes a special cooled air outlet duct 148 which is coupled to the duct structure 63 for delivering the cooled air to a point of use, and includes the air diversion means 70 for the purposes described above. In addition to delivering cooled air to the point of use and diverting a portion thereof for evaporative chilling of the heat exchanger 14 in the above explained regenerative action, the air delivery structure 146 is provided with a second air diversion means in the form of an auxiliary opening 150 formed in one of the side walls 151 of the air outlet duct 148.

A feedback means 152 including a cooled air inlet elbow 154, a duct 156, and a cooled air outlet elbow 158 is provided to accomplish a second regenerative action.

The inlet elbow 154 is suitably connected to the opening 150 provided on the air delivery structure 146, such as by being connected to a flange 159 formed on the side wall 151 so as to circumscribe the opening 150. The air outlet elbow 158 is similarly connected to a flange 160 provided in the side wall 143 of the air supply housing 140 so as to circumscribe the auxiliary inlet port 142 thereof. And, the duct 156 has its opposite ends connected to the extending ends of the elbows 154 and 158.

As shown best in FIG. 5, a damper means 162 is mounted in the feedback duct 156 for movement between closed and open positions in a conventional and well known manner. The damper means 162 preferably includes a disc-shaped plate, or flapper 164 which is pivotably movable on shafts 165 and 166, which are attached to the flapper so as to extend oppositely from diametrically opposed sides thereof through the side wall of the duct 156. The shaft 166 has a suitable lever 168 mounted fast thereon with the lever being connected to a control rod 170. The control rod 170 may be connected to any suitable means (not shown) for producing a linear motion of the rod 170 which, by means of the lever 168, produces a rotary motion of the flapper 164. For example, the rod 170 may extend downwardly through the roof 64 (FIG. 1) into the building 65 and may have a stepping motor (not shown), pull handle (not shown) or the like, attached to its depending end.

When the air conditioner 10a is operating, a portion of the cooled air emerging from the heat exchanger structure 14 (FIG. 1) will be diverted into the feedback means 152 and will move therethrough into the air supply structure 20a. Thus, the air which is drawn into the air input mechanism 26 will be made up of a mixture of the relatively warm ambient air which moves into the housing 140 through the inlet 25 and the relatively cooler air supplied by the feedback means 152. Mixing of the air from those two sources will result in a lowering of the temperature of the air emerging from the heat exchanger. This relatively cooler air will result in further lowering of the temperature of the mixed air in the air supply structure 20a and constitutes the hereinbefore mentioned second regenerative action in which the temperature is progressively lowered until stabilization is achieved.

Figures 6, 7, 8:
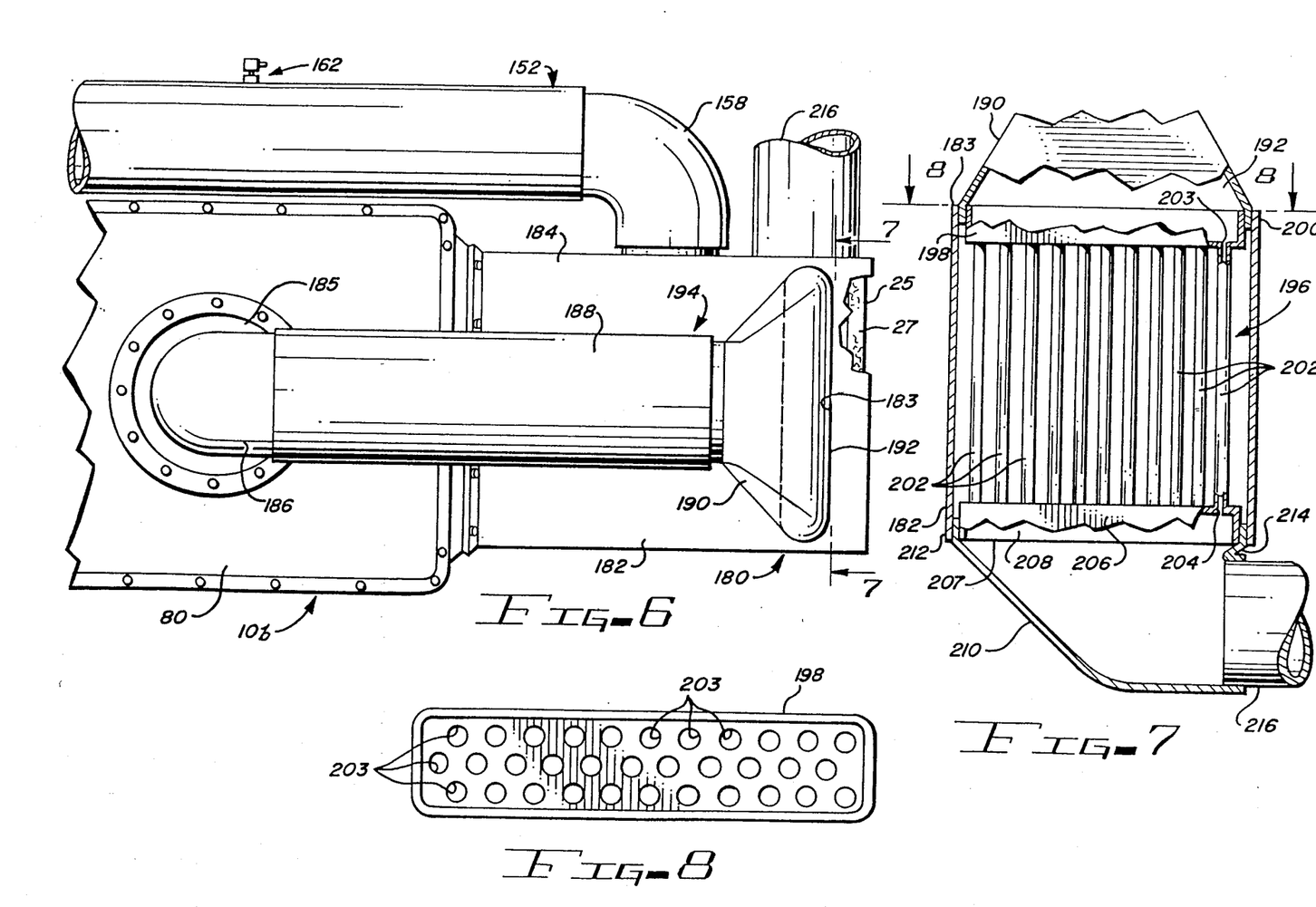
FIG. 6 is a fragmentary top view of a third embodiment of the air conditioner of the present invention.
FIG. 7 is a fragmentary sectional view taken along the line 7—7 of FIG. 6.
FIG. 8 is an enlarged sectional view taken along the line 8—8 of FIG. 7.

Reference is now made to FIGS. 6, 7 and 8, wherein a third embodiment of the air conditioner is shown with this embodiment being indicated in its entirety by the reference numeral 10b. The air conditioner 10b is similar to the previously described air conditioners 10 and 10a and many of the components remain the same both structurally and functionally. Therefore, the same reference numerals will be used herein for the components and sub-assemblies which are common.

The air conditioner 10b includes a modified form of air supply structure 180 having a housing 182 with the ambient air inlet 25 formed therein in which the air filter 27 may be mounted. The housing 182 has an opening 183 formed in the top wall 184 for reasons which will become apparent as this description progresses. The air input mechanism 26 (FIG. 1) is mounted in the housing 182 and operates, as previously described, to draw ambient air through the inlet 25 into the housing and supply it under pressure to the transition duct 36.

The air supply structure 180 supplies air to the main heat exchanger structure 14 (FIG. 1) which is mounted in the evaporation chamber defined by the cabinet 12 (FIG. 1) and the cover 80. As hereinbefore fully described, a portion of the air supplied to the heat exchanger structure 14 is diverted and employed to accomplish chilling of the heat exchanger structure 14 by evaporation. In the previously described embodiments, that air after being used for evaporatively cooling the heat exchanger 14, enters the output portion 18 (FIG. 1) of the evaporation chamber and was exhausted to ambient through the exhaust port 106 (FIG. 1).

In the present embodiment, the screen 110 (FIG. 1) is removed from the exhaust port 106 and an adapter duct 185 is bolted or otherwise attached to the cover 80. A suitable elbow duct 186 is connected to the open upper end of the adapter duct 185 and one end of an exhaust air duct 188 is connected to the outlet end of the elbow duct 186. The other end of the exhaust duct 188 is connected to the inlet end of a transition duct 190. The transition duct 190 is provided with an oval-shaped outlet end 192 which fits into the opening 183 provided in the top wall 184 of the air supply housing 182. Thus, the exhaust air which would otherwise be exhausted to ambient, is directed back to the air supply structure 180 by the adapter duct 185, elbow 186, exhaust air duct 188 and the transition duct 190 which are hereinafter collectively referred to as the exhaust air return duct assembly 194.

The air supply structure 180 is provided with a preliminary heat exchanger 196 which, as shown in FIG. 7, is of substantially rectangular configuration so as to fit within the housing 182 in juxtaposed relationship with the air filter 27. The preliminary heat exchanger 196 is mounted so as to be downstream of the air inlet 25 and is configured so that the ambient air being drawn into the housing 182 will pass through the preliminary heat exchanger 196.

The heat exchanger 196 is provided with an upwardly opening inlet manifold 198 the upper rim of which is sealingly attached to the oval-shaped outlet end 192 of the transition duct 190 in any suitable manner such as is shown at 200. A plurality of tubes 202 are connected to the inlet manifold 198 so as to depend therefrom, with the open upper ends 203 of the tubes 202 opening upwardly into the inlet manifold. The open lower ends 204 of the tubes 202 open downwardly into an outlet manifold 206 which is provided with a lower rim 207 which circumscribes a bottom opening 208 provided in the outlet manifold. The lower rim 207 of the outlet manifold 206 and the upper end of an air outlet transition duct elbow 210 are sealingly interconnected such as in the manner shown at 212 and pass through a suitably configured opening 214 formed in the bottom wall of the housing 182. An outlet duct 216 is connected to the outlet transition elbow duct 212 for reasons which will hereinafter be described in detail.

The air that is continuously supplied to the outlet portion 18 (FIG. 1) of the evaporation chamber will have a relatively low temperature by virtue of its having first passed through the main heat exchanger structure 14 (FIG. 1) and then being involved in the evaporation process within the main heat exchanger 14. This exhaust air will have a relatively high moisture content as a result of the evaporation process but its temperature will be relatively low in comparison to ambient air temperatures. Therefore, by directing the exhaust air through the return duct assembly 194 and the preliminary heat exchanger 196, another form of regeneration action will take place in the air conditioner structure 10b.

The exhaust air will cool the tubes 202 and the manifolds 198 and 206, and thus an indirect heat exchange will take place which reduces the total heat content of the air which passes through the preliminary heat exchanger 196 on its way to the air conditioner 10b. This moisture ladened exhaust air will absorb some of the heat from the incoming ambient air and ideally should not be allowed to re-enter the air conditioner 10b through the inlet 25 thereof. This is the reason for the hereinbefore mentioned outlet duct 216 which directs the exhaust air to a location remote from the inlet 25 of the air conditioner and exhaust it to ambient at that remote location.

From the above, it will be appreciated that the air conditioner of this invention can be configured in several ways. First, in accordance with the air conditioner 10 which includes structure for accomplishing the first regenerative action. Second, in accordance with the air conditioner 10a which is configured to accomplish both the first and second forms of regenerative actions. Third, the air conditioner 10 could be provided with the exhaust air utilization structure of the air conditioner 10b to provide a combined structure which is configured to accomplish the first and third regenerative actions. Fourth, the air conditioner 10b can be configured to accomplish all three of the regenerative actions which, of course, provides the lowest output air temperatures.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. An air conditioner comprising:
   (a) a cabinet defining an internal evaporation chamber and having an air inlet and an air outlet;
   (b) a heat exchanger mounted in said cabinet and defining an air movement path between the air inlet and the air outlet thereof, said heat exchanger disposed to separate the evaporation chamber of said cabinet into an input portion and an output portion and having at least one chiller tube extending transversely of the air movement path and opening oppositely into the input portion and the output portion of the evaporation chamber of said cabinet;
   (c) means for supplying air to be cooled to the air inlet of said cabinet of movement through the air movement path of said heat exchanger in a heat exchanger relationship about the chiller tube thereof for extracting heat from the air to be cooled;
   (d) air diversion means for continuously diverting some of the air emerging from the air outlet of said cabinet which would otherwise be directed to a point of use and directing it into instead and without admixture into the input portion of the evaporation chamber of said cabinet to provide the sole source of air for movement through the chiller tube of said heat exchanger into the output portion of the evaporation chamber of said cabinet; and
   (e) means in the evaporation chamber of said cabinet for recirculatingly spraying water into the chiller tube of said heat exchanger for interacting with the diverted air moving therethrough to evaporatively cool said heat exchanger.

2. An air conditioner as claimed in claim 1 and further comprising air delivery means for receiving the air from the air outlet of said cabinet, said air diversion means being associated with said air delivery means for diverting some of the air received by said air delivery means which directs the balance of the received air to a point of use.

3. An air conditioner as claimed in claim 2 and further comprising:
   (a) said air delivery means being an air outlet duct defining an air movement path therethrough, said air outlet duct having an inlet end connected to the air outlet of said cabinet and having an outlet end for coupling to the point of use, said air outlet duct having an opening formed therein between the inlet and outlet ends thereof; and
   (b) said air diversion means being mounted in the opening formed in said air outlet duct so as to extend into the air path defined thereby.

4. An air conditioner as claimed in claim 3 wherein said air diversion means is adjustable for changing the extending distance thereof into the air movement path defined by said air outlet duct.

5. An air conditioner as claimed in claim 1 wherein said means for recirculatingly spraying water comprises:
   (a) a water reservoir in the input portion of the evaporation chamber of said cabinet;
   (b) at least one spray nozzle in the output portion of the evaporation chamber of said cabinet;
   (c) pump means in the water reservoir for supplying water under pressure to said spray nozzle; and
   (d) said water reservoir being disposed to receive the water sprayed by said spray nozzle after passage thereof through the chiller tube of said heat exchanger for recirculation of the water by said pump means.

6. An air conditioner as claimed in claim 5 and further comprising:
   (a) said heat exchanger being disposed so that the air movement path defined thereby is in a substantially horizontal attitude;
   (b) said heat exchanger having a plurality of the chiller tubes mounted to extend transversely of the air movement path in spaced relationship with respect to each other, each of said plurality of chiller tubes having an upwardly opening end and a downwardly opening end which open oppositely and exteriorly of said heat exchanger into the input portion and the output portion of the evaporation chamber of said cabinet; and
   (c) said heat exchanger being mounted in said cabinet to locate the input portion of the evaporation chamber thereof below said heat exchanger and to locate the output portion of the evaporation chamber thereof above said heat exchanger.

7. An air conditioner as claimed in claim 6 and further comprising a porous wettable pad medium in underlaying relationship with the downwardly opening ends of said plurality of chiller tubes of said heat exchanger.

8. An air conditioner comprising:
   (a) a cabinet defining an internal evaporation chamber and having an air inlet and an air outlet;
   (b) a heat exchanger mounted in said cabinet and defining an air movement path between the air inlet and the air outlet thereof, said heat exchanger disposed to separate the evaporation chamber of said cabinet into an input portion and an output portion and having at least one chiller tube extending transversely of the air movement path and opening oppositely into the input portion and the output portion of the evaporation chamber of said cabinet;

(c) means for supplying air to be cooled to the air inlet of said cabinet for movement through the air movement path of said heat exchanger in a heat exchange relationship about the chiller tube thereof for extracting heat from the air to be cooled;

(d) air diversion means for continuously diverting some of the air emerging from the air outlet of said cabinet and directing it without admixture into the input portion of the evaporation chamber of said cabinet to provide the sole source of air for movement through the chiller tube of said heat exchanger into the output portion of the evaporation chamber of said cabinet;

(e) means in the evaporation chamber of said cabinet for recirculatingly spraying water into the chiller tube of said heat exchanger for interacting with the diverted air moving therethrough to evaporatively cool said heat exchanger; and (f) feedback means for diverting some of the air emerging from the air outlet of said cabinet and directing it without admixture to said means for supplying air to be cooled.

9. An air conditioner as claimed in claim 8 and further comprising air delivery means for receiving the air from the air outlet of said cabinet, said air diversion means and said feedback means being associated with said air delivery means for diverting some of the air received by said air delivery means which directs the balance of the received air to a point of use.

10. An air conditioner as claimed in claim 9 and further comprising:
(a) said air delivery means being an air outlet duct defining an air movement path therethrough, said air outlet duct having an inlet end connected to the air outlet of said cabinet and having an outlet end for coupling to the point of use, said air outlet duct having first and second auxiliary outlet openings formed therein between the inlet and outlet ends thereof;
(b) said air diversion means being mounted in the first auxiliary opening formed in said air outlet duct so as to extend into the air path defined thereby; and
(c) said feedback means being coupled to the second auxiliary outlet opening formed in said air outlet duct.

11. An air conditioner as claimed in claim 10 wherein said air diversion means is adjustable for changing the extending distance thereof into the air movement path defined by said air outlet duct.

12. An air conditioner as claimed in claim 9 wherein said means for supplying air to be cooled includes an ambient air inlet and an auxiliary air inlet.

13. An air conditioner as claimed in claim 12 wherein said feedback means comprises:
(a) a first elbow duct one end of which is connected to the second auxiliary outlet opening of said air outlet duct and having an opposite end;
(b) a second elbow duct one end of which is connected to the auxiliary air inlet of said means for supplying air to be cooled and having an opposite end;
(c) a duct connected to extend between the opposite end of said first elbow duct and the opposite end of said second elbow duct; and
(d) damper means in said duct of said feedback means for adjustably controlling the flow of air movable therethrough.

14. A air conditioner as claimed in claim 8 and further comprising:
(a) said heat exchanger being disposed so that the air movement path defined thereby is in a substantially horizontal attitude;
(b) said heat exchanger having a plurality of the chiller tubes mounted to extend transversely of the air movement path in spaced relationship with respect to each other, each of said plurality of chiller tubes having an upwardly opening end and a downwardly opening end which open oppositely and exteriorly of said heat exchanger into the input portion and the output portion of the evaporation chamber of said cabinet; and
(c) said heat exchanger being mounted in said cabinet to locate the input portion of the evaporation chamber thereof below said heat exchanger and to locate the output portion of the evaporation chamber thereof above said heat exchanger.

15. An air conditioner as claimed in claim 14 wherein said means for recirculatingly spraying water comprises:
(a) a water reservoir in the input portion of the evaporation chamber of said cabinet for supplying the water to be sprayed into the chiller tubes of said heat exchanger and for receiving the unevaporated water from the downwardly opening ends thereof;
(b) a distribution manifold in the output portion of the evaporation chamber of said cabinet in overlaying relationship with the upwardly opening ends of the plurality of chiller tubes of said heat exchanger;
(c) a plurality of spray nozzles in said distribution manifold to provide a spacedly arranged array of said spray nozzles in overlaying relationship with the upwardly opening ends of the plurality of chiller tubes of said heat exchanger;
(d) a pump in said water reservoir;
(e) conduit means connected between said pump and said distribution manifold for supplying water from said reservoir to said distribution manifold when said pump is operated; and
(f) a porous wettable pad medium in underlaying relationship with the downwardly opening ends of said plurality of chiller tubes of said heat exchanger.

16. An air conditioner comprising:
(a) a cabinet defining an internal evaporation chamber;
(b) a main heat exchanger mounted in said cabinet and defining an air movement path through said cabinet, said main heat exchanger disposed to separate the evaporation chamber of said cabinet into an input portion and an output portion and having at least one chiller tube extending transversely of the air movement path and opening oppositely into the input portion and the output portion of the evaporation chamber of said cabinet;
(c) an air input mechanism for supplying air to be cooled for movement through the air movement path of said main heat exchanger in an indirect heat exchange relationship with the chiller tube thereof for extracting heat from the air to be cooled, said air input mechanism having an ambient air inlet and an auxiliary air inlet;

(d) air delivery means for receiving the air emergable from the air movement path of said main heat exchanger and directing it to a point of use;

(e) air diversion means for continuously diverting some of the air emerging from the air movement path defined by said main heat exchanger and directing it without admixture into the input portion of the evaporation chamber of said cabinet to proivde the sole source of air for movement through the chiller tube of said main heat exchanger into the output portion of the evaporation chamber of said cabinet;

(f) means in the evaporation chamber of said cabinet for spraying water into the chiller tube of said main heat exchanger for interacting with the diverted air moving therethrough to evaporatively cool said heat exchanger;

(g) a preliminary heat exchanger in said air input mechanism through which the air to be cooled passes on its way into the air movement path defined by said main heat exchanger;

(h) means for directing the air from the output portion of the evaporation chamber of said cabinet to said preliminary heat exchanger for cooling thereof to produce an indirect heat exchange extraction of the heat from the air to be cooled before it moves into the air movement path defined by said main heat exchanger; and (i) feedback means for diverting some of the air receivable in said air delivery means and directing it without admixture to the auxiliary air inlet of said air input mechanism for mixing with the air to be cooled subsequent to its passage through said preliminary heat exchanger.

17. An air conditioner as claimed in claim 16 wherein said preliminary heat exchanger comprises:

(a) an air inlet manifold;

(b) an air outlet manifold; and (c) at least one tube extending between said air input manifold and said air output manifold and having its opposite ends in open communication therewith.

18. An air conditoner as claimed in claim 17 wherein said means for directing the air from the output portion of the evaporation chamber of said cabinet comprises:

(a) said cabinet having an exhaust port which is open to the output portion of the evaporation chamber defined thereby; and (b) an exhaust air return duct assembly having one end coupled to the exhaust port of said cabinet and having an opposite end which is coupled to said air inlet manifold of said preliminary heat exchanger.

19. An air conditoner as claimed in claim 17 and further comprising an outlet duct connected to said air outlet manifold for directing air therefrom to a remote location.

20. An air conditioning structure as claimed in claim 16 wherein said feedback means comprises:

(a) said air delivery means including a cooled air outlet duct having an inlet for receiving air from said main heat exchanger, an outlet for directing the air receivable from said main heat exchanger to the point of use and having an auxiliary opening; and (b) a feedback duct means connected between the auxiliary opening of said air delivery means and the auxiliary air inlet of said air input mechanism.

21. An air conditioner as claimed in claim 16 and further comprising:

(a) said main heat exchanger being disposed so that the air movement path defined thereby is in a substantially horizontal attitude;

(b) said main heat exchanger having a plurality of chiller tubes mounted to extend transversely of the air movement path in spaced relationship with respect to each other, each of said plurality of chiller tubes having an upwardly opening end and a downwardly opening end which open oppositely and exteriorly of said main heat exchanger into the input portion and the output portion of the evaporation chamber of said cabinet; and (c) said heat exchanger being mounted in said cabinet to locate the input portion of the evaporation chamber thereof below said main heat exchanger and to locate the output portion of the evaporation chamber thereof above said main heat exchanger.

22. An air conditioner as claimed in claim 21 wherein said means for spraying water comprises:

(a) a water reservoir in the input portion of the evaporation chamber of said cabinet for supplying the water to be sprayed into the chiller tubes of said main heat exchanger and for receiving the unevaporated water from the downwardly opening ends thereof;

(b) a distribution manifold in the output portion of the evaporation chamber of said cabinet in overlaying relationship with the upwardly opening ends of the plurality of chiller tubes of said main heat exchanger;

(c) a plurality of spray nozzles in said distribution manifold to provide a spacedly arranged array of said nozzles in overlaying relationship with the upwardly opening ends of the plurality of chiller tubes of said main heat exchanger;

(d) a pump in said water reservoir;

(e) conduit means connected between said pump and said distribution manifold for supplying water from said reservoir to said distribution manifold when said pump is operated; and (f) a porous wettable pad in underlaying relationship with the downwardly opening ends of the plurality of chiller tubes of said main heat exchanger.

* * * * *